US010168920B2

(12) United States Patent
Abe et al.

(10) Patent No.: US 10,168,920 B2
(45) Date of Patent: Jan. 1, 2019

(54) DUPLEXING FILE SYSTEM DATA

(71) Applicant: International Business Machines Corporation, Armonk, NY (US)

(72) Inventors: Atsushi Abe, Kanagawa-ken (JP); Takashi Ashida, Yamato (JP); Tohru Hasegawa, Tokyo (JP); Hiroshi Itagaki, Yokohama (JP); Shinsuke Mitsuma, Machida (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/832,213

(22) Filed: Aug. 21, 2015

(65) Prior Publication Data
US 2017/0052718 A1   Feb. 23, 2017

(51) Int. Cl.
G06F 3/06      (2006.01)
G11B 5/008     (2006.01)

(52) U.S. Cl.
CPC ............ G06F 3/0619 (2013.01); G06F 3/065 (2013.01); G06F 3/0631 (2013.01); G06F 3/0643 (2013.01); G06F 3/0653 (2013.01); G06F 3/0686 (2013.01); G11B 5/00813 (2013.01)

(58) Field of Classification Search
CPC .... G06F 3/0631; G06F 3/0619; G06F 3/0643; G06F 3/065; G06F 3/0653; G06F 3/0686; G11B 5/00813
See application file for complete search history.

(56) References Cited

U.S. PATENT DOCUMENTS

| | | | |
|---|---|---|---|
| 6,453,396 B1 | 9/2002 | Boone et al. | |
| 6,578,120 B1 * | 6/2003 | Crockett | G06F 3/0601 711/114 |
| 7,007,129 B2 * | 2/2006 | Sekine | G06F 3/061 703/24 |
| 7,200,546 B1 * | 4/2007 | Nourmohamadian | G06F 3/0607 360/49 |
| 7,302,540 B1 * | 11/2007 | Holdman | G06F 11/1456 711/112 |
| 8,731,897 B2 * | 5/2014 | Matze | G06F 3/0605 703/24 |
| 8,832,365 B1 | 9/2014 | Sims et al. | |

(Continued)

OTHER PUBLICATIONS

"Linear Tape File System (LTFS) Format Specification", Aug. 17, 2011, LTFS Format Version 2.0.1, pp. 1-71.

Primary Examiner — Rocio Del Mar Perez-Velez
(74) Attorney, Agent, or Firm — Daniel R. Simek

(57) ABSTRACT

One or more processors receive data records from a file system, and convert the data records to a tape image having a format defined by the file system. The tape image is written to a first storage device, and a sequence of data types of the first storage device and a second storage device are monitored to determine whether the first storage device sequence of data types differs from the sequence of data types of the second storage device. Determining that the sequence of data types of the first storage device and second storage device do differ, one or more processors copying, to the second storage device, the data records from the first storage device, from the position on the first storage device that corresponds to the end-of-data position of the second storage device, to the end-of-data position of the first storage device.

18 Claims, 6 Drawing Sheets

(56) References Cited

U.S. PATENT DOCUMENTS

| | | | |
|---|---|---|---|
| 2004/0044842 A1* | 3/2004 | Trimmer | G06F 3/0605 |
| | | | 711/111 |
| 2005/0193235 A1* | 9/2005 | Sandorfi | G06F 11/1456 |
| | | | 714/6.12 |
| 2006/0218434 A1 | 9/2006 | Solhjell | |
| 2008/0244205 A1* | 10/2008 | Amano | G06F 11/1451 |
| | | | 711/162 |
| 2010/0057789 A1* | 3/2010 | Kawaguchi | G06F 11/1456 |
| | | | 707/E17.005 |
| 2010/0185813 A1* | 7/2010 | Muroyama | G06F 11/1658 |
| | | | 711/111 |
| 2010/0250229 A1* | 9/2010 | Matze | G06F 3/0605 |
| | | | 703/24 |
| 2011/0040942 A1* | 2/2011 | Akirav | G06F 17/30575 |
| | | | 711/159 |
| 2012/0310883 A1* | 12/2012 | Akirav | G06F 17/30212 |
| | | | 707/626 |
| 2014/0108720 A1* | 4/2014 | Abe | G06F 17/30067 |
| | | | 711/111 |
| 2014/0379980 A1* | 12/2014 | Hasegawa | G06F 3/065 |
| | | | 711/111 |
| 2015/0012696 A1* | 1/2015 | Inai | G06F 3/0686 |
| | | | 711/111 |
| 2016/0041780 A1* | 2/2016 | Iwasaki | G06F 3/065 |
| | | | 711/161 |
| 2016/0092131 A1* | 3/2016 | Nakajima | G06F 3/0661 |
| | | | 711/111 |
| 2016/0283165 A1* | 9/2016 | Robinson | G06F 3/061 |
| 2016/0371151 A1* | 12/2016 | Masuda | G06F 11/1451 |

* cited by examiner

| | | TAPE IMAGE INFORMATION — 505 | | DATA POSITION IN HDD |
|---|---|---|---|---|
| PARTITION | POSITION | DATA TYPE | RECORD LENGTH | START SECTOR |
| 0 | 0 | R | 4096 | 1024 |
| 0 | ... | ... | ... | ... |
| 0 | 3 | E | 0 | 1032 |
| 1 | 1 | R | 4096 | 20480 |
| 1 | 2 | F | 0 | 24576 |
| 1 | 3 | R | 8192 | 24576 |
| 1 | ... | ... | ... | ... |
| 1 | 7 | E | 0 | 40960 |

FIG. 5

DUPLEXING FILE SYSTEM DATA

The present invention relates to data backup of a file system, and more specifically, to a method of duplexing data in a file system which manages files using a tape drive.

BACKGROUND OF THE INVENTION

A backup operation is apt to be complicated, but if there is a mechanism whereby data written on a first storage device, such as a hard disk drive (HDD), can be easily and conveniently duplicated in another file system, it is possible to prevent data loss due to failure of the first storage device.

In some backup approaches RAID1 (mirroring) technology is used, which duplexes the data written to a HDD. RAID1 writes identical data onto plural disks by random block access based on a block by block basis, and is generally limited to use of HDDs, due to the use of random access capability.

File systems, such as LTFS (linear tape file system) enable sequential access of data on a tape drive (TD) as a file in a file system. By using a file system such as LTFS, the use and versatility of tape storage is enhanced.

On the tape drive, a read/write command does not specify a block number which differs from a read/write command of a block device, such as an HDD. The read/write command of the tape drive specifies that a read/write be carried out at the current tape position, and when the command is successful, the current position is updated. The current position can be acquired using a "read position" command, and the current position may be set at any location using a locate/space command.

SUMMARY OF THE INVENTION

Embodiments of the present invention provide for a method, system and computer program product for duplicating data of a file system. In one embodiment, a method for duplicating data of a file system includes one or more processors that receives data records from a file system in response to an input-output request of an application. The one or more processors convert the data records to a tape image, wherein the tape image assumes a format defined by the file system. The one or more processors write the tape image to a first storage device, in which the tape image includes a sequence of data types including data records, file markers, and an end-of-data position of the tape image on the first storage device. The one or more processors monitor the sequence of data types of the first storage device, and a sequence of data types of a second storage device. The one or more processors determine whether the sequence of data types of the first storage device differs from the sequence of data types of the second storage device, and in response to determining the sequence of data types of the first storage device does differ from the sequence of data types of the second storage device, the one or more processors copy, to the second storage device, the data records from the first storage device, from a position on the first storage device that corresponds to an end-of-data position of the second storage device, to the end-of-data position of the first storage device.

BRIEF DESCRIPTION OF THE DRAWING

FIG. 5 is a diagram illustrating an example of storage information of tape images, in accordance with an embodiment of the present invention.

DETAILED DESCRIPTION

Embodiments of the present invention implement duplexing of file data by writing data converted to a tape image in a format consistent with an LTFS, to a hard disk drive (HDD), and subsequently copying the data onto tape by use of a mirroring component adapted to asynchronously monitor for differences between data records of the HDD and tape drive (TD), and copy the writes made to the HDD, to the TD. In some embodiments of the present invention, a tape drive emulation component (TDEC), and a mirroring component (MC), are modules integrated with tape duplication program 600 (described in detail below). In other embodiments of the present invention tape duplication program 600 includes a TDEC and MC as callable functions. In yet other embodiments, TDEC and MC may be separate applications receiving operational commands from tape duplication program 600.

Figures 1, 2:
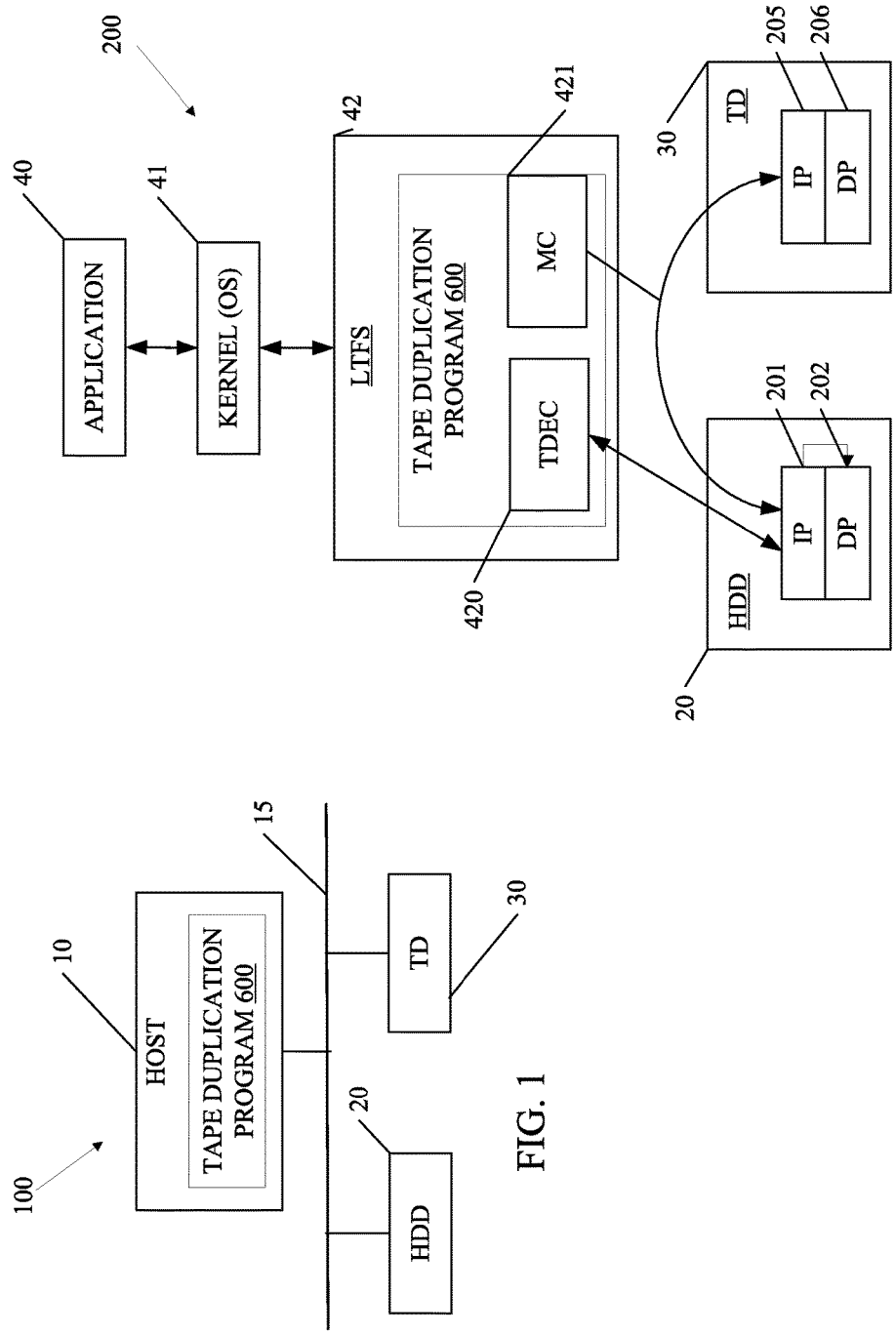
FIG. 1 is a block diagram of an exemplary computing storage environment, in accordance with an embodiment of the present invention.
FIG. 2 is a block diagram illustrating a configuration example of data duplexing in a file system, in accordance with an embodiment of the present invention.

The following includes a description of embodiments of the present invention with reference to the drawings. FIG. 1 is a diagram showing a configuration example of a computing storage environment, generally designated 100, which operates a file system in accordance with an embodiment of the present invention. Computing storage environment 100 includes host 10, hard disk drive (HDD) 20, and tape drive (TD) 30, all interconnected through network 15. Although depicted in FIG. 1 as singular entities, each of host 10, HDD 20 and TD 30 can include one or more similar entities.

Host 10 operates tape duplication program 600. Host 10 may be a laptop computer, a tablet computer, a netbook computer, a personal computer (PC), a desktop computer, a personal digital assistant (PDA), a smart phone, a web server, a mobile computing device, or any other electronic device or computing system capable of performing programming instructions, and receiving and sending data. In other embodiments, host 10 represents a virtual computing device of a computing system utilizing multiple computers as a server system, such as in a cloud computing environment. In yet other embodiments, host 10 represents an access point to a computing system utilizing clustered computers and components (e.g., database server computers, application server computers, etc.) that act as a single pool of seamless resources when accessed within computing storage environment 100. Host 10 may include internal and external hardware components, as depicted and described with reference to FIG. 7.

HDD 20 is a storage device that may be a disk drive installed within host 10, or may be external to host 10 and accessed via network 15. HDD 20 may have the form of other storage devices such as a solid-state storage device (SSD etc.), or a USB storage device. TD 30 can be a single type tape drive or a set type tape drive, such a tape library. The logical data types on tape include a data record (REC), which is a data string having a specific length, a file mark (FM), which is a separator with a length of 0, representing a data break, and an end-of-data (EOD), which is a marker indicating the end of data records as a position subsequent to the last data record written to the storage device, and the beginning point at which new records are to be written. To append data with the current position set at position 7 and a write command having been issued, a record (REC #7) is written to tape, and if successful, both the current position and the EOD position are updated to 8. During a write activity, LTFS uses only appends, and thus the discussion herein includes appends.

Computing storage environment 100 may also include an HSM (hierarchical storage management) system (not shown), and may include file storage techniques such as RAID1, in which one of a plurality of HDDs is replaced with a tape drive, such as TD 30.

Network 15 can be, for example, a local area network (LAN), a telecommunications network, a wide area network (WAN), such as the Internet, a virtual local area network (VLAN), or any single or combination of networks that can include wired, wireless, or optical connections. In general, network 150 can be any combination of connections and protocols that will support communications between host 10, HDD 20, tape duplication program 600, and TD 30, in accordance with embodiments of the present invention.

Host 10 mounts and executes a file system used in the present invention. The file system used has the operational properties of a linear tape file system (LTFS), for example, LTFS 42. LTFS 42 can perform direct access to the files stored on tape, such as files stored on a tape cartridge. Having direct access to files written to the tape cartridge is similar to direct access of files stored on a HDD, a SSD, a flash drive, a USB memory drive, or other removable recording storage medium, such as a compact disk recordable (CD-R), if the tape cartridge is inserted in a tape drive, such as TD 30.

Tape duplication program 600 is depicted as included in host 10 and is operated by host 10 to receive I/O write requests from OS 41, passed to LTFS 42, and convert the data by use of TDEC 420, to a block format, consistent with the formatting associated with LTFS 42. The converted file data is referred to as a "tape image", and is written to a first storage device, such as HDD 20. Tape duplication program 600 asynchronously directs mirroring component (MC) 421 to determine if a difference exists between the EOD position of data written to HDD 20, and the EOD position of data written to TD 30, for a given tape volume having a particular data partition and index partition set. Stated otherwise, the sequence of data types of HDD 20 and TD 30 (data types: Record # N, File Marker, End-Of-Data), are compared to determine if there is a difference. In response to determining that the HDD 20 EOD position differs from the EOD position for TD 30 (or the data type sequences differ), for the given data partition, tape duplication program 600 copies to TD 30, the data record sequence from the HDD 20 tape image position corresponding to the EOD position of TD 30, to the current EOD position of HDD 20, and additional read/write requests are performed on HDD 20 without receiving confirmation of the completion of data record copy to TD 30.

FIG. 2 is a block diagram illustrating configuration example 200 of data duplexing in a file system, such as an LTFS, in accordance with an embodiment of the present invention. In configuration example 200, application 40 issues a command that generates an I/O request (e.g., a copy command), to the operating system, Kernel (OS) 41, to write a file, for example. OS 41 passes the file write request to LTFS 42 in the random block access format, such as the format of a file allocation table (FAT) or new technology file system (NTFS). LTFS 42 processes the received write request, and writes data received by LTFS 42 onto HDD 20 as a tape image, using tape drive emulation component (TDEC) 420.

TDEC 420 converts a file I/O request, received by the LTFS, into a tape image record written in tape format, and records the record as a file on HDD 20. For the case in which a read request is passed to LTFS 42, the starting read location of HDD 20 is determined by TDEC 420. TDEC converts a file I/O request received by LTFS into a record written to actual tape and records the record as a file on the hard disk. The area on the hard disk used to store the file can be the entire hard disk, one partition obtained by dividing the hard disk, an image file provided in another file system, or the like, and in any of these cases, the capacity of the area is lower than or equal to the capacity of the tape. Each directory in the file system is regarded as one reel of tape (this will be referred to as a tape image).

The data written onto HDD 20 is read out in block access mode, and copied sequentially onto TD 30 by tape duplication program 600 operating with mirroring component (MC) 421. The operation of mirroring the data from HDD 20 to TD 30, by MC 421 has a minor impact on the operations of read/write requests from the application because reading and/or writing the file data onto HDD 20 and reading-out the tape image from HDD 20 are performed in block access mode. Therefore, application 40 is able to continue to submit read/write requests, regardless of the status or mirroring activity (duplexing) of tape duplication program 600, using MC 421, which copies data changes made to HDD 20, to TD 30. The mirroring operation, or copying of data record changes to HDD 20 to TD 30 is performed asynchronously, independent of processing I/O requests submitted from application 40, and read/write requests may continue to be received from application 40 and performed on HDD 20 without confirmation of the completion of copied data records to TD 30.

To achieve automatic data duplexing between HDD 20 and TD 30 data, which is passed from OS 41 to LTFS 42, is written onto HDD 20 using TDEC 420 to generate a tape image. The data of the tape image on HDD 20 is sequentially copied onto TD 30, by tape duplication program 600 using MC421, independent of processing by TDEC 420. TDEC 420 converts the file data of a write request, passed to LTFS 42, to records of a tape image. The records of the tape image on HDD 20 are recorded according to the LTFS format, which is as if the data of LTFS format is written onto actual tape. TDEC 420 constructs the records of the tape image according to LTFS format and writes the records onto HDD 20. Subsequently, TDEC 420 identifies the tape image on HDD 20 corresponding to the file data of the read request received through LTFS 42 from application 40, and reads the file data from HDD 20.

IP 201 and IP 205 are index partitions for HDD 20 and TD 30, respectively, and DP 202 and DP 206 are data partitions for HDD 20 and TD 30, respectively. The Index Partition (IP), is used as a central place to store an index of the data records. IP 201 includes the file system meta-data for all files written to the first storage volume of LTFS file system, HDD 20, and includes information regarding the filename and the location of the file content on HDD 20. The index partition occupies a relatively small amount of the total media capacity. In embodiments of the present invention, the content of files, or records, are converted by TDEC 420 to a tape image format and written to the larger of the two partitions on the first storage device, HDD 20. The larger partition is referred to as the data partition (DP), represented by DP 202. Similarly, IP 205 is an index partition for TD 30, and DP 206 is the data partition for TD 30.

The area on HDD 20 used to store the file can be the entire HDD, one partition obtained by dividing the HDD, an image file provided in another file system, or the like. In any of these cases, the capacity of the area used to store the file is less than, or equal to the capacity of the tape. MC 421 performs mirroring from HDD 20 to TD 30, independent of TDEC 420's processing of the read/write request, and without considering (monitoring) the on-going status of TDEC 420's processing of the read/write request. In response to a read/write access to HDD 20, completion reports of the read/write requests can be immediately returned to application 40 without waiting for the completion of a write operation by MC 421 to the tape of TD 30. Application 40 is able to promptly submit the next write/read request.

Figure 3:
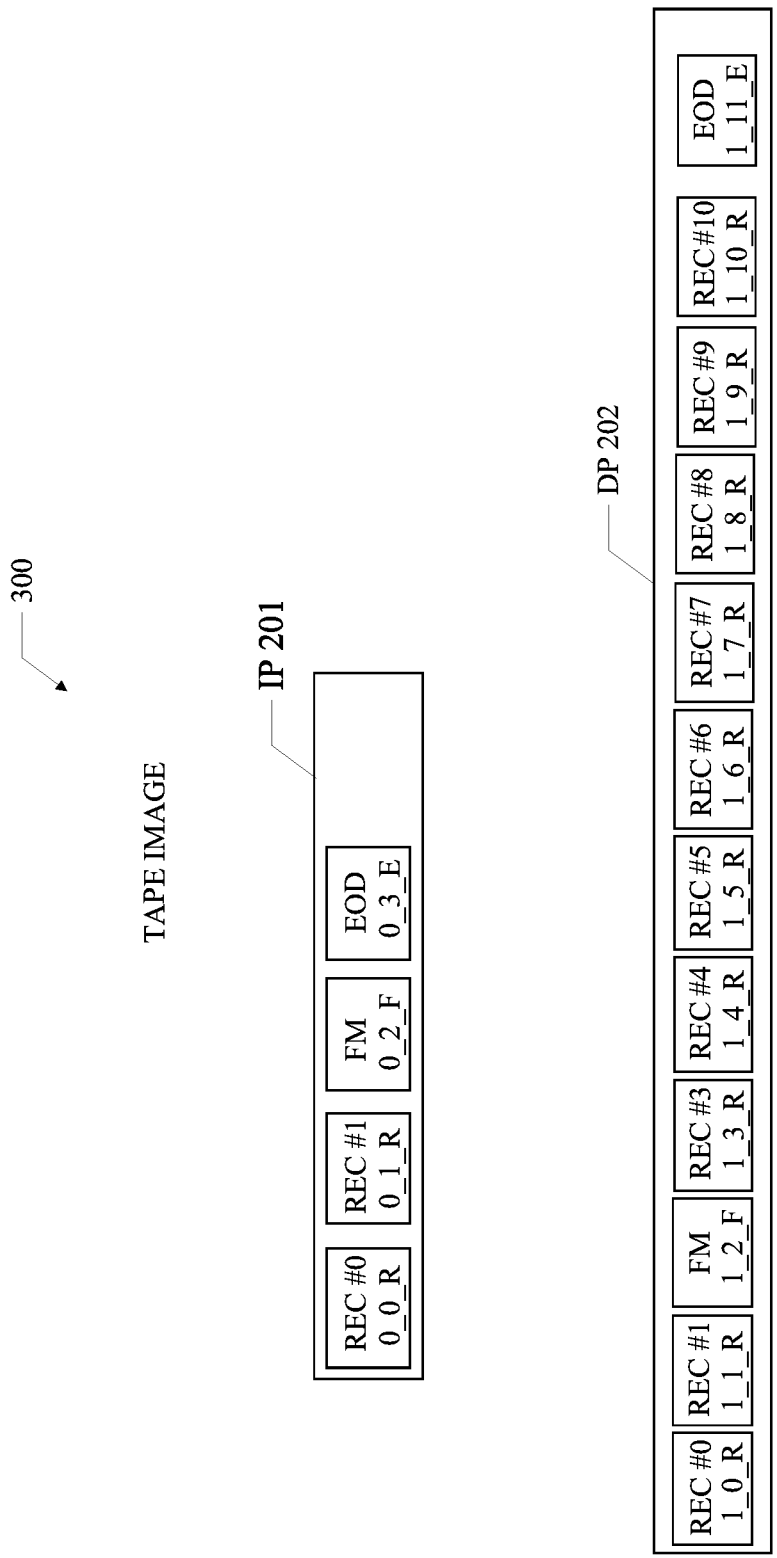
FIG. 3 is a block diagram illustrating an example of a tape image formed in a first storage device, in accordance with an embodiment of the present invention.

FIG. 3 is a block diagram illustrating an example of tape image 300 formed in a first storage device in accordance with an embodiment of the present invention. Tape image 300 which, in one embodiment, has been written to a directory of a first storage device, such as HDD 20. Index partition (IP) 201 and data partition (DP) 202, are depicted as components of tape image 300 written to a first storage device, for example, HDD 20. In some embodiments of the present invention, directories of the file system are regarded as one volume of tape. Records within a directory of a first storage device, such as HDD 20, are referred to as a tape image due to the format of the LTFS file system that is used. TDEC 420 (FIG. 1) converts the file data from the application initiating a read or a write I/O command to the tape image, which includes three data types: a data record (REC #), a file mark (FM), and an end-of-data marker (EOD), within a partition. Each data type is recorded by writing file data within an LTFS partition of the first storage device, such as HDD 20. An exemplary tape image of a file is shown in FIG. 3, which is named in a manner similar to the following example:

[partition]_[record_number]_[record_type]

in which the partition identifies the directory to which the data is written, and the record number and record type identifies the particular file and file content, respectively. The type of data written to a tape image includes "record (REC#)", "file mark (FM)", and "end-of-data" (EOD)", which are logical data types on a tape, and have the following meaning, respectively:

record (REC): A data string having a length. The TD reads and writes data on a record by record basis.
file mark (FM): A separator with a length of 0 which represents data break (a file separator at the time of backup).
end-of-data (EOD): End of data. An example of a file name ("A_B_C") is shown below with reference to FIG. 3.

In IP 201 (Partition#0):
Partition=0, Record number=0, Record type=Record: "0_0_R"
Partition=0, Record number=1, Record type=Record: "0_1_R"
Partition=0, Record number=2, Record type=FM: "0_2_F"
Partition=0, Record number=3, Record type=EOD: "0_3_E"

In DP 202 (Partition#1):
Partition=1, Record number=4, Record type=Record: "1_4_R"
Partition=1, Record number=2, Record type=FM: "1_2_F"
Partition=1, Record number=11, Record type=EOD: "1_11_E"

MC 421 monitors whether a tape image in any given directory is identical with the corresponding data on the tape. In response to detecting that a change has been made to tape image 300, MC 421 asynchronously updates the changes detected by reflecting the changes made to the tape image on a first storage device to the corresponding records on the tape. An example of MC 421 for the simplest data duplexing between a HDD and a tape is shown below. Note that data may be copied to plural tapes using plural TDs (multiplexing) or that the data on the first storage device, for example, HDD 20, may be erased automatically subsequent to the data having been copied onto the tape (multiplexing on tape alone). Data copied to TD 30 is done as an append to the last data record on the tape of TD 30, and begins at the location of the current EOD marker, which is moved subsequent to the last added data type copied to TD 30.

(1) MC 421 acquires the location of the EOD on the tape image from the file on the first storage device, and the location of the EOD on the actual tape from the read position command used in small computer system interface (SCSI) standards.
(2) If the location of the EOD on the tape image is larger than the location of the EOD on the actual tape, the content records are copied starting from the EOD position on the actual tape and ending with the EOD position on the current tape image.

Figure 4:
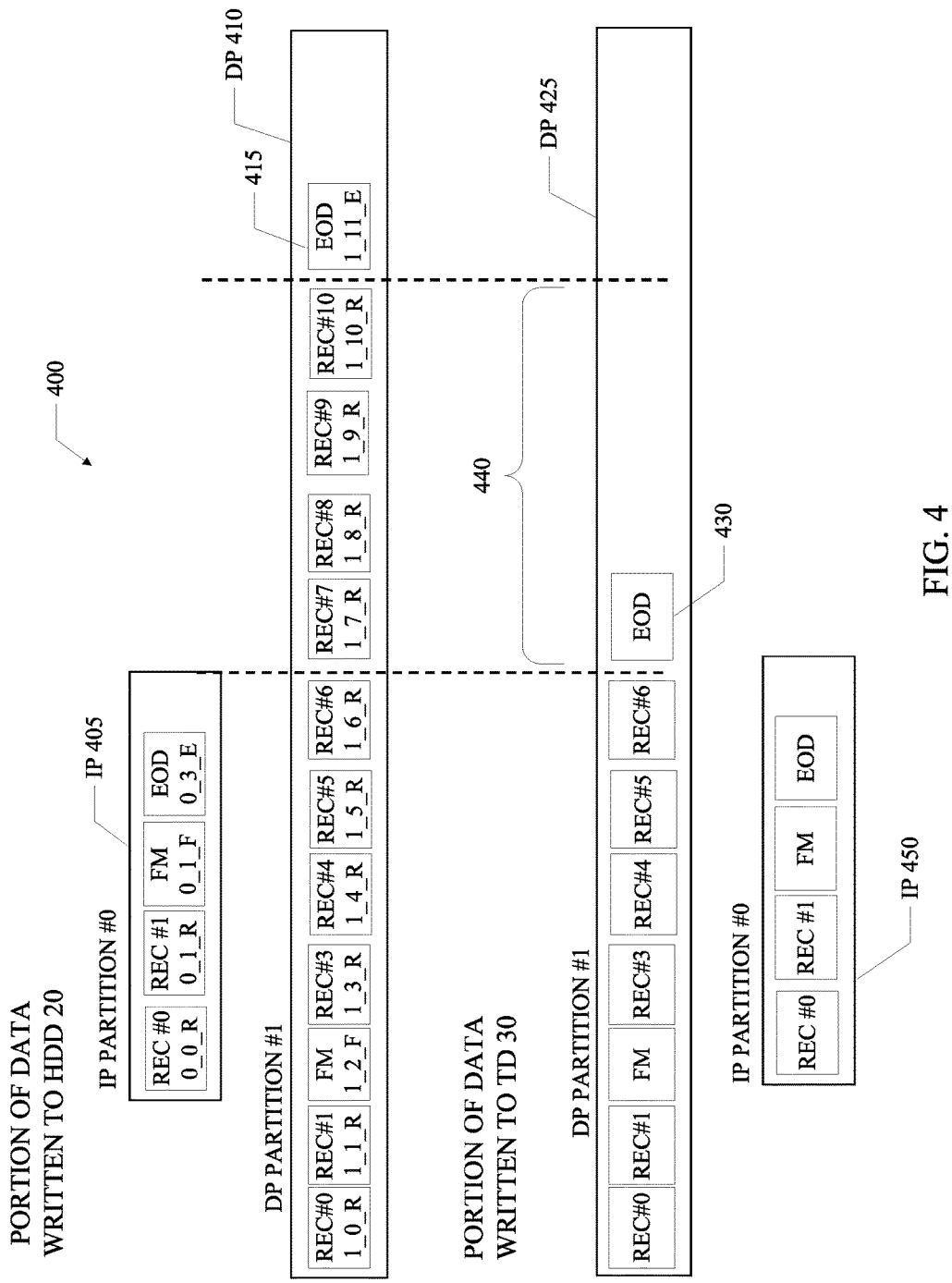
FIG. 4 is a diagram illustrating an example of a difference between data stored as a tape image on a first storage device and data stored on tape of a tape drive as a second storage device, in accordance with an embodiment of the present invention.

FIG. 4 is a diagram illustrating stored data example 400 of a difference between data stored as a tape image on a first storage device and data stored on tape of a tape drive, in accordance with an embodiment of the present invention. Stored data example 400 includes a representation of data written to HDD 20, as a first storage device, and data written to TD 30, as a second storage device, with additional data written to HDD 20 than TD 30. IP 405 is an index partition (#0) and DP 410 is a data partition (#1), of HDD 20, and EOD 415 marks the position of the end of data on DP 410. IP 450 is an index partition (#0) of TD 30, and DP 425 is a data partition of TD 30, with EOD 430 marking the position of the end of data for DP 425. Data difference 440 indicates the difference between the records written to DP 410 of HDD 20 and DP 425 of TD 30. An example of mirroring (duplexing) data by MC 421 is shown in FIG. 4. As MC 421 monitors for differences between tape images stored on a first storage device and the corresponding data stored on tape, the following activities are performed:

(A) MC 421 compares the position "1_11_E" of EOD 415 on DP (Partition #1) of HDD 20 (directory) with the position of EOD 430 of the data of DP (Partition #1) on TD 30.
(B) Because the position of EOD ("1_11_E") of DP (Partition #1) on HDD is different and larger than the position of EOD on TD 30, MC 421 copies the data of records REC#7 ("1_7_R") through REC#10

("1_10_R"), which is equivalent to the difference between the EOD positions of data on TD 30 and data on HDD 20, as shown in FIG. 4. The meta-data of the file is overwritten on an IP, but the entire contents of the IP are designed to be rewritten when a file system cache is flushed, therefore there is no need to compare the difference between IPs.

Because LTFS is an append-only file system, TDEC 420 always writes data as an append, beginning with the EOD of the tape image. Therefore, if the position of EOD on the tape image differs from the position of EOD on the actual tape, MC 421 writes the difference by appending the records starting from the position corresponding to the EOD of DP 206 on the tape of TD 30, and ending with the position corresponding to the EOD on the current tape image of DP 202 on HDD 20. In the event that the connection with the tape (TD 30) is interrupted for some reason and subsequently restored, data duplexing can be resumed effectively because the difference between the storage devices can be updated by MC 421 verifying the two EOD positions, as shown in FIG. 4.

FIG. 5 is a table illustrating an example of storage information of tape images, in accordance with an embodiment of the present invention. In some embodiments of the present invention, an arbitrary continuous region on a HDD is regarded as corresponding to one volume of tape. TDEC 420 converts file data received from an application to a tape image, according to the file system format. For example, application 40 (FIG. 2), passes an I/O command for file data to OS 41, which sends the I/O command for file data to LTFS 42. The file data is retrieved, or located in memory and TDEC 420 converts the file data to a tape image, consistent with the LTFS 42 format, and writes the tape image to HDD 20 in a designated continuous region. A table for managing the position of the data on a tape, the kind of data, and the region where data is stored, is prepared for the region on HDD 20. The data records of a file are written to a head of a sector on HDD 20, and the position of the written record is aligned with the sector boundary. The tape image, having a format consistent with DP 410 (FIG. 4) is written into continuous sectors of HDD 20. In other embodiments of the present invention, TDEC 420 creates the tape image based on the LTFS format and the file data submitted from application 40, and writes the tape image on randomized sectors of HDD 20, collectively part of the corresponding one volume of tape. MC 421 reads the tape image from HDD 20, independent of TDEC operations, and sequentially copies the tape image differences between HDD 20 and TD 30, from HDD 20 to TD 30.

The storage information included in table 505 of FIG. 5 includes partition 510, position 520, data type 530, record length 540 and start sector 550. In embodiments of the present invention storage information, such as that depicted in table 505, is retained and accessed by tape duplication program 600 to perform read/write I/O activities on file data. Partition 510 includes the partition identification information. For example, partition 0 designates an index partition, and partition 1 designates a data partition, of a particular volume. Position 520 indicates a starting location of data records from which the record length is determined to read or write a data record. Data type 530 designates whether the data is a "record" (R) containing file data content, a "file mark" (F) that has no length, but indicates a separation of data records, and "end-of-data", which indicates the last position of data for a corresponding tape volume on a HDD, or the last position of data on a tape drive. Start sector 550 identifies the starting sector on the HDD of the particular tape image. For example, the record (R) in partition 0 and at position 0, having a record length of 4096, is stored in the HDD region that begins at sector 1024. The record (R) in partition 1, at position 1, is stored in the HDD region that begins at sector 20480, and has a record length of 4096. A file mark (F) is in partition 1, and starts (is located) at sector 24576 on a HDD, such as HDD 20. The termination of the data, designated by "E" as end-of-data (EOD) is depicted in partition 1 at position 7, and is stored in the sector starting at 40960 on HDD 20. If a subsequent tape image is written to HDD 20, the tape image will have a starting sector of 40960, and the EOD data type will move to the end of the newly written record.

Figure 6:
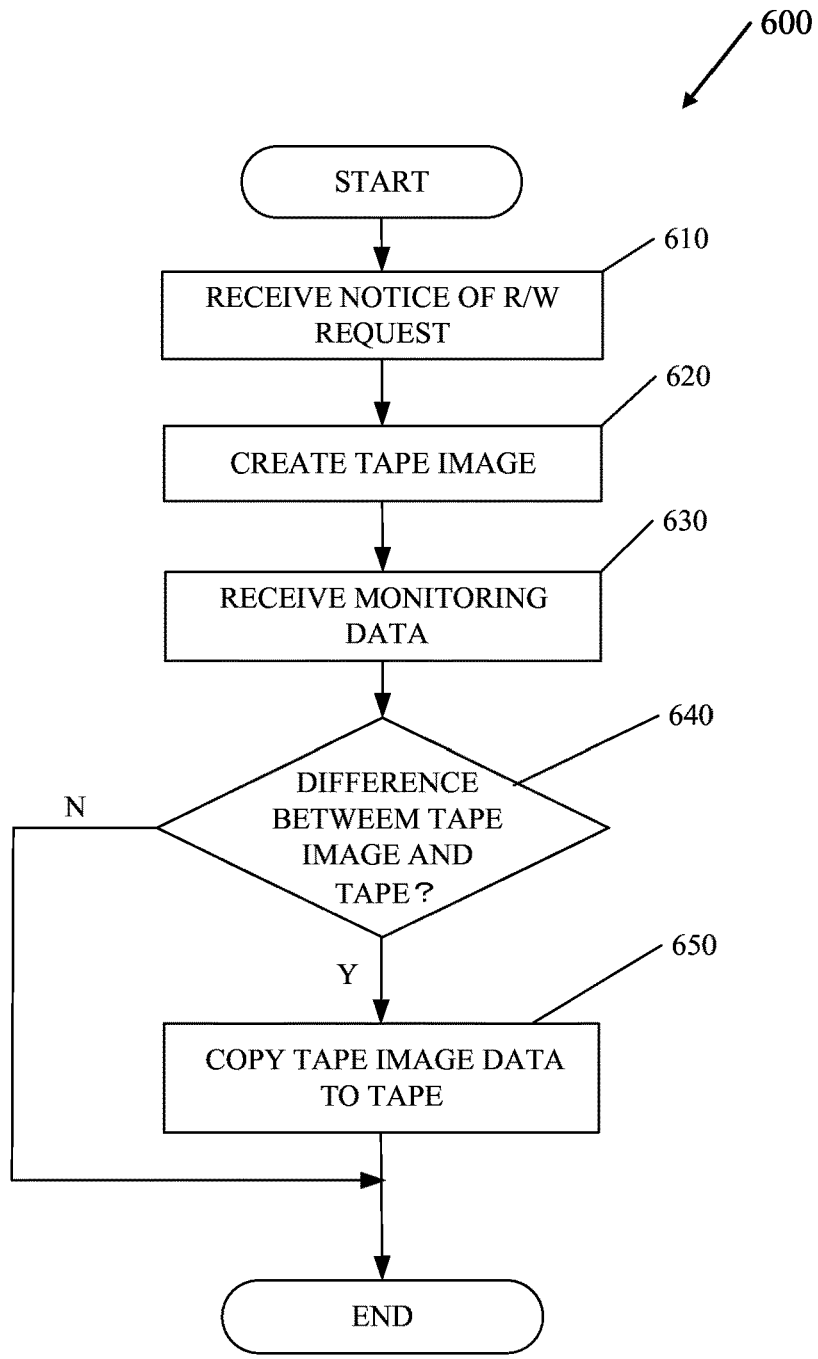
FIG. 6 is a flowchart depicting the operational steps of a tape duplication program, performing a data duplexing method, in accordance with an embodiment of the present invention.

FIG. 6 is a flowchart depicting the operational steps of a tape duplication program 600, performing a data duplication method, in accordance with an embodiment of the present invention In some embodiments of the present invention, the flow of FIG. 6 is performed in LTFS42, by tape duplication program 600, which directs activities of TDEC420 and MC421) of FIG. 2, described above. Tape duplication program 600, which in some embodiments of the present invention includes program instructions that may be embodied in a computer program product comprising a computer readable storage medium. The program instructions can be accessed from the computer readable storage medium and executed by one or more processors of a computing device, such as host 10 shown in FIG. 1. In step 610, tape duplication program 600 receives notification that the file system has received a write request or read request of file data as a file I/O command from OS 41. The application can submit a read/write request without verifying on-going status of file data duplication. For example, application 40 (FIG. 2) sends a write request to OS 41, which passes the request to LTFS 42, and tape duplication program 600 receives a notification of the write request.

In step 620, the tape image corresponding to the received write request, or read request, is created. In some embodiments of the present invention, tape duplication program 600 initiates the performance of the I/O activity and the conversion of the file data from the I/O activity to or from a tape image format, by TDEC 420. For example, having received notification of a write request received by LTFS 42, tape duplication program 600 passes the file data to TDEC 420, which converts the file data to create a tape image of a format consistent with LTFS 42, which is written to HDD 20.

In step 630, tape duplication program 600 receives monitoring data input from the mirroring component. The mirroring component, such as MC 421, monitors the EOD position of tape images written to the first storage device, and the EOD position of tape image data written to the tape drive. For example, MC 421 monitors tape images written in LTFS format to HDD 20, determining the EOD location for the tape images. MC 421 also monitors the records written to TD 30 and determines the EOD position of TD 30 records. MC421 passes the EOD position information to tape duplication program 600.

In decision step 640 tape duplication program 600, working in conjunction with MC 421 to monitor the tape image of HDD 20 and the EOD position and/or data type sequence of TD 30, determines if there is a difference between the EOD position of a tape image on the first storage device (HDD), and a corresponding EOD position of data on the tape of the TD. For example, MC 421 passes the EOD position of a tape image written to DP 410 of HDD 20 (FIG. 4), and passes the corresponding file data EOD position written to DP 425 of TD 30, to tape duplication program 600. Tape duplication program 600 compares the position of EOD 415 in DP 410 of HDD 20 to the position of EOD 430 in DP 425 on TD 30, and determining that there is no difference in the respective EOD position between DP 410 of HDD 20 and DP 425 of TD 30 (step 640, "NO" branch), tape duplication program 600 ends for the particular received I/O request.

In the case in which tape duplication program 600 determines that the position of EOD 415 of DP 410 (reference FIG. 4), is greater than the position of EOD 430 of DP 425, as represented by data difference 440, tape duplication program 600 copies the records beginning at the position on DP 410, that corresponds to the position of EOD 430 on DP 425, up to EOD 415 on DP 410. In this example, tape duplication program 600 copies REC#7 through REC#10 from DP 410 on HDD 20, and writes the records beginning at the position of EOD 430 on DP 425 of TD 30, and EOD 430 is moved to the position on DP 425 that corresponds to the position of EOD 415 of DP 410. In another embodiment of the present invention, tape duplication program 600 determines that the sequence of data types, such as record numbers (REC #), file marks (FM) and/or end-of-data markers (EOD) differ between the tape image of HDD 20 and the tape of TD 30.

In step 650 tape duplication program 600 copies the difference of the data between the HDD and tape drive, to the tape on the tape drive. In some embodiments of the present invention, tape duplication program 600 works in conjunction with MC 421, and starts copying record data from the HDD at the HDD data partition position that corresponds to the position of the EOD on the data partition of the tape drive, and sets the position of the EOD for the tape drive at the end of the copied data records. Subsequent to copying the data, (assuming for example no additional writes were made to the data partition of the HDD), the EOD position on the data partition of the tape drive aligns with the EOD position on the data partition of the HDD. The mirroring, or copying, of records to tape is performed asynchronously, and I/O request commands received by LTFS 42 may continue to proceed without verification of copy-to-tape completion. In other embodiments, tape duplication program 600 calls MC 421 to copy data differences from HDD 20 to TD 30.

For example, (referring to FIG. 4) EOD 430 on DP 425 of TD 30 is determined by tape duplication program 600 to be in position 7, which corresponds to the position of record "REC#7" on DP 410 of HDD 20. Tape duplication program 600 begins copying record "REC#7" from DP 410 of HDD 20, to position 7 on DP 425 of TD 30, and continues to copy records until EOD 415 is reached on DP 410. EOD 430 is located to position 11 on DP 425, which corresponds to the location of EOD 415, at position 11 on DP 410 of HDD 20.

Figure 7:
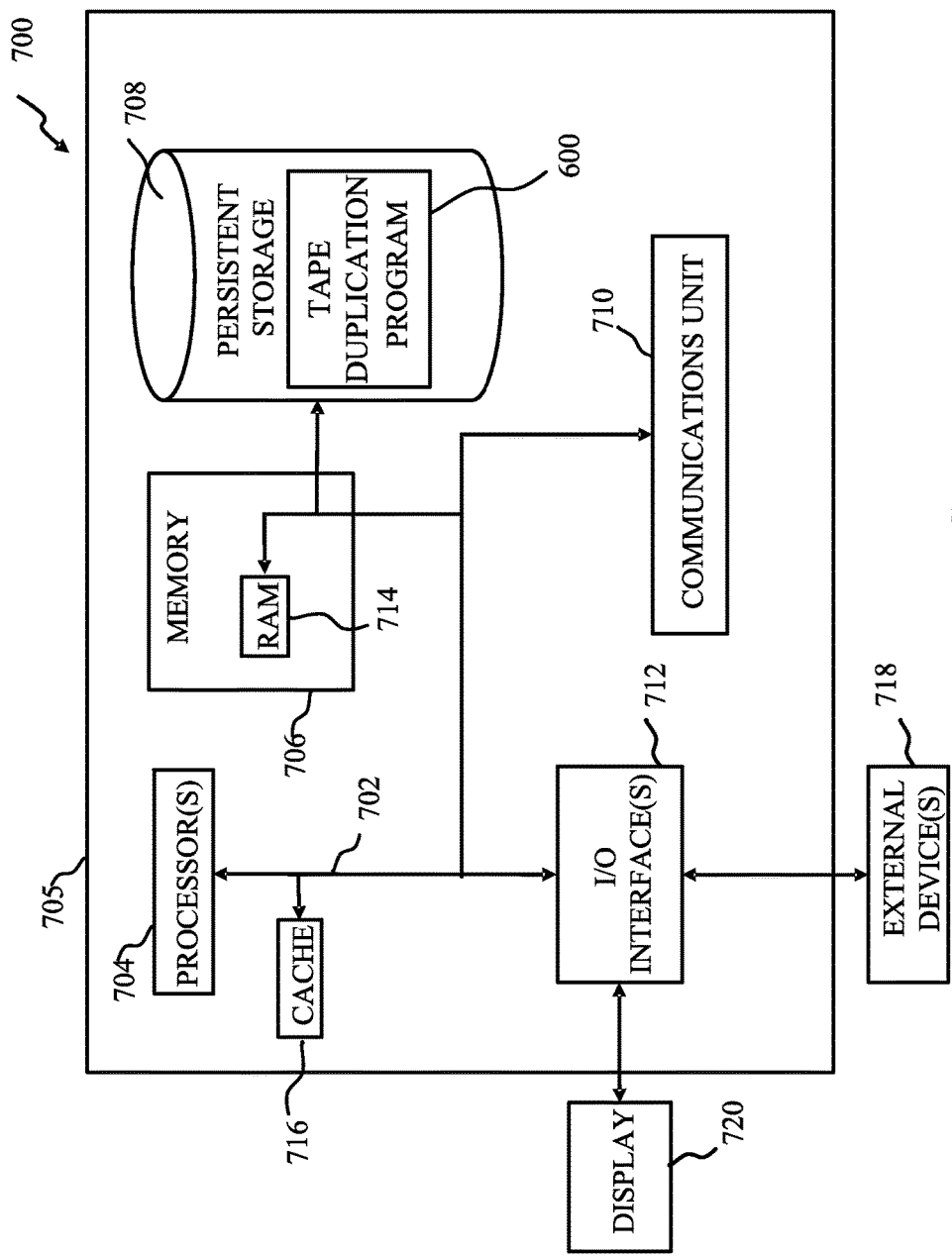
FIG. 7 is a block diagram of components of a computing system, including a computing device capable of operationally performing the tape duplication program of FIG. 6, in accordance with an embodiment of the present invention.

Monitoring of data type sequence, and/or EOD position of tape images on HDD 20, and tape data type sequence, and/or EOD position on TD 30, is continuous, regardless of read/write requests from applications operating on host 10. During the mirroring step, in which data records from tape images on the HDD are copied or updated to tape on the tape drive, applications, such as application 40, may continue to submit read/write requests. The operational steps of tape duplication program 600 may be performed independent of verification of mirroring of the data to tape, and can be conducted without suspending read/write operation requests. FIG. 7 is a block diagram of components of computing system 700, including computing device 705 which, similar to host 10, is capable of operationally performing tape duplication program 600, in accordance with an embodiment of the present invention.

Computing system 700, includes computing device 705, having components and functional capability similar to host 10, to operate tape duplication program 600, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 705 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706, cache memory 716, and persistent storage 708 are computer readable storage media. In this embodiment, memory 706 includes random access memory (RAM) 714. In general, memory 706 can include any suitable volatile or non-volatile computer readable storage media.

Tape duplication program 600 is stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of computing storage environment 100 and computing device 705, and host 10. In these examples, communications unit 710 includes one or more network interface cards. Communications unit 710 may provide communications through the use of either or both physical and wireless communications links. Tape duplication program 600 may be downloaded to persistent storage 708 through communications unit 710.

I/O interface(s) 712 allows for input and output of data with other devices that may be connected to computing system 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., tape duplication program 600, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments of the present invention have been described with reference to the accompanying drawings, but are not limited by the descriptions and examples. Embodiments of the present invention may be carried out in forms to which various improvements, corrections, and modifications are added based on the knowledge of those skilled in the art without departing from the purpose of the present invention.

The invention claimed is:

1. A method for duplicating data of a file system, the method comprising:
   receiving, by one or more processors, data records of a non-sequential file system in response to an input-output request of an application;
   converting, by one or more processors, the data records of the non-sequential file system to a tape image, wherein the tape image assumes a format defined by a file system of a first storage device;
   writing, by one or more processors, the tape image to the first storage device, wherein the tape image includes a sequence of data types including data records, file markers, and a marker of an end-of-data position of the tape image on the first storage device;
   monitoring, by one or more processors, a position of an end-of-data data type marker within the sequence of data types of the first storage device, and a position of an end-of-data data type marker within a sequence of data types of a second storage device;
   determining, by one or more processors, whether the position of the end-of-data data type marker within the sequence of data types of the first storage device differs from the position of the end-of-data data type marker within the sequence of data types of the second storage device; and
   responsive to determining the position of the end-of-data data type marker within the sequence of data types of the first storage device does differ from the position of the end-of-data data type marker within the sequence of data types of the second storage device, copying, by one or more processors, to the second storage device, the data records from the first storage device, from a position on the first storage device that corresponds to the position of the end-of-data data type marker of the second storage device, to the position of the end-of-data data type marker of the first storage device.

2. The method of claim 1, wherein the file system of the first storage device is a linear tape file system (LTFS) having an index partition separate from a data partition.

3. The method of claim 2, wherein converting the data records from the non-sequential file system to a tape image by use of a tape drive emulation component (TDEC), and information on the tape image includes record number and record type, which specifies a logical data type corresponding to a record type on a tape of a tape drive as the second storage device.

4. The method of claim 1, wherein the end-of-data position of the first storage device having a position that differs from the end-of-data position of the second storage device indicates that changes to the data records have been made to the first storage device and not yet copied to the second storage device.

5. The method of claim 1, wherein copying to the second storage device, the data records from the first storage device, from the position on the first storage device that corresponds to the end-of-data position of the second storage device, to the end-of-data position of the first storage device is performed asynchronously, and allows additional read/write requests to be performed by the first storage device without confirmation of completion of activity copying data records to the second storage device.

6. The method of claim 1, wherein the first storage device is a random access, block storage device to which the tape image is written, and the second storage device is a tape drive that includes a tape formatted to correspond to the file system of the first storage device.

7. A computer program product for duplicating data of a file system, the computer program product comprising:
   one or more computer readable storage media wherein the computer readable storage medium is not a transitory signal per se, and program instructions stored on the one or more computer readable storage media, the program instructions comprising:
   program instructions to receive data records of a non-sequential file system in response to an input-output request of an application;
   program instructions to convert the data records of the non-sequential file system to a tape image, wherein the tape image assumes a format defined by a file system of a first storage device;
   program instructions to write the tape image to the first storage device, wherein the tape image includes a sequence of data types including data records, file markers, and a marker of an end-of-data position of the tape image on the first storage device;
   program instructions to monitor a position of an end-of-data data type marker within the sequence of data types of the first storage device, and a position of an end-of-data data type marker within a sequence of data types of a second storage device;
   program instructions to determine whether the position of the end-of-data data type marker of the sequence of data types of the first storage device differs from the position of the end-of-data data type marker within the sequence of data types of the second storage device; and
   responsive to determining the position of the end-of-data data type marker of the sequence of data types of the first storage device does differ from the position of the end-of-data data type marker within the sequence of data types of the second storage device, program instructions to copy, to the second storage device, the data records from the first storage device, from a position on the first storage device that corresponds to the position of the end-of-data data type marker of the second storage device, to the position of the end-of-data data type marker of the first storage device.

8. The computer program product of claim 7, wherein the file system of the first storage device is a linear tape file system (LTFS) having an index partition separate from a data partition.

9. The computer program product of claim 8, wherein program instructions to convert the data records from the non-sequential file system to a tape image by use of a tape drive emulation component (TDEC), and information on the tape image includes record number and record type, which specifies a logical data type corresponding to a record type on a tape of a tape drive as the second storage device.

10. The computer program product of claim 7, wherein the end-of-data position of the first storage device having a position that differs from the end-of-data position of the second storage device indicates that changes to the data records have been made to the first storage device and not yet copied to the second storage device.

11. The computer program product of claim 7, wherein the program instructions to copy, to the second storage device, the data records from the first storage device, from the position on the first storage device that corresponds to the end-of-data position of the second storage device, to the end-of-data position of the first storage device is performed asynchronously, and allows additional read/write requests to the first storage device without confirmation of completion of activity copying to the second storage device.

12. The computer program product of claim 7, wherein the first storage device is a random access, block storage device to which the tape image is written, and the second storage device is a tape drive that includes a tape formatted to correspond to the file system of the first storage device.

13. A storage system for duplicating data of a file system, the storage system comprising:
one or more computing devices, each of the one or more computing devices one or more computer processors, one or more computer readable storage media, program instructions stored on the computer readable storage media for execution by at least one of the one or more processors, the program instructions comprising:
program instructions to receive data records from a non-sequential file system in response to an input-output request of an application;
program instructions to convert the data records of the non-sequential file system to a tape image, wherein the tape image assumes a format defined by a file system of a first storage device;
program instructions to write the tape image to the first storage device, wherein the tape image includes a sequence of data types including data records, file markers, and a marker of an end-of-data position of the tape image on the first storage device;
program instructions to monitor a position of an end-of-data data type marker within the sequence of data types of the first storage device, and a position of an end-of-data data type marker within a sequence of data types of a second storage device;
program instructions to determine whether the position of the end-of-data data type marker within the sequence of data types of the first storage device differs from the position of the end-of-data data type marker within the sequence of data types of the second storage device; and
responsive to determining the position of the end-of-data data type marker within the sequence of data types of the first storage device does differ from the position of the end-of-data data type marker within the sequence of data types of the second storage device, program instructions to copy, to the second storage device, the data records from the first storage device, from a position on the first storage device that corresponds to the position of the end-of-data data type marker of the second storage device, to the position of the end-of-data data type marker of the first storage device.

14. The storage system of claim 13, wherein the file system is a linear tape file system (LTFS) having an index partition separate from a data partition.

15. The storage system of claim 14, wherein program instructions to convert the data records from the non-sequential file system to a tape image by use of a tape drive emulation component (TDEC), and information on the tape image includes record number and record type, which specifies a logical data type corresponding to a record type on a tape of a tape drive as the second storage device.

16. The storage system of claim 13, wherein the end-of-data position of the first storage device having a position that differs from the end-of-data position of the second storage device indicates that changes to the data records have been made written to the first storage device and not yet copied to the second storage device.

17. The storage system of claim 13, wherein the program instructions to copy, to the second storage device, the data records from the first storage device, from the position on the first storage device that corresponds to the end-of-data position of the second storage device, to the end-of-data position of the first storage device, is performed asynchronously, and allows additional read/write requests to the first storage device to be performed without confirmation of completion of activity copying data records to the second storage device.

18. The storage system of claim 13, wherein the first storage device is a random access, block storage device to which the tape image is written, and the second storage device is a tape drive that includes a tape formatted to correspond to the file system of the first storage device.

* * * * *